United States Patent
Strzalkowski (10) Patent No.: US 10,419,251 B2
(45) Date of Patent: Sep. 17, 2019

(54) DIGITAL SIGNAL TRANSFER USING INTEGRATED TRANSFORMERS WITH ELECTRICAL ISOLATION

(75) Inventor: Bernhard Strzalkowski, Munich (DE)

(73) Assignee: INFINEON TECHNOLOGIES, Neubiberg (DE)

( * ) Notice: Subject to any disclaimer, the term of this patent is extended or adjusted under 35 U.S.C. 154(b) by 1114 days.

(21) Appl. No.: 11/776,390

(22) Filed: Jul. 11, 2007

(65) Prior Publication Data

US 2007/0258513 A1    Nov. 8, 2007

Related U.S. Application Data

(63) Continuation of application No. 10/666,221, filed on Sep. 18, 2003, now abandoned.

(30) Foreign Application Priority Data

Sep. 18, 2002 (DE) .................................. 102 43 197

(51) Int. Cl.
*H04L 25/08* (2006.01)
*H04L 25/00* (2006.01)
*H04B 3/00* (2006.01)

(52) U.S. Cl.
CPC .............. *H04L 25/085* (2013.01); *H04B 3/00* (2013.01); *H04L 25/00* (2013.01)

(58) Field of Classification Search
USPC ....... 375/219, 220, 222, 257, 258, 259, 260, 375/286, 288; 333/1, 100, 117, 118, 119, (Continued)

(56) References Cited

U.S. PATENT DOCUMENTS 3,058,078 A    10/1962  Hoh
3,349,328 A *  10/1967  Hunkins ................. H04L 27/24
                                                    341/52

(Continued)

FOREIGN PATENT DOCUMENTS

DE    2529296       1/1977
DE    28 21 812     5/1978

(Continued)

OTHER PUBLICATIONS

Gavrilova et al, Pulse transformer contain toroidal core multi turn wind dielectric film base contact area locate opposed side window output, Jan. 7, 1993, Derwent—ACC-No. 1994-033533,Abstracted—Pub-No. SU 1786521 A1.*

(Continued)

*Primary Examiner* — Jean B Corrielus
(74) *Attorney, Agent, or Firm* — Oblon, McClelland, Maier & Neustadt, L.L.P.

(57) ABSTRACT

An isolator includes a transmitter, a coupling module and a receiver. The transmitter drives an input of the coupling module in response to a digital signal, such that in response to a first type of digital data value in the digital signal, a signal of a first predetermined type is supplied to the input and in response to a second type of digital data value in the digital signal, a signal of a second predetermined type is supplied to the input, the signals of the first type and the second type each including an initiation signal that announces a time window during which another portion of the signals representing a digital data value of the first type or the second type will be valid. The receiver is coupled to an output of the coupling module to receive and to decode signals in correspondence to the signals provided to the input.

7 Claims, 9 Drawing Sheets

(58) Field of Classification Search
USPC .................................. 333/24 R, 167, 177
See application file for complete search history.

(56) References Cited

U.S. PATENT DOCUMENTS

| | | | |
|---|---|---|---|
| 3,409,889 A * | 11/1968 | Graham | G01S 11/08 342/31 |
| 3,465,101 A * | 9/1969 | Christian | H03K 3/315 375/258 |
| 3,525,946 A * | 8/1970 | Grace | H03D 3/04 329/327 |
| 3,537,022 A | 10/1970 | Regan | |
| 3,573,740 A | 4/1971 | Berger et al. | |
| 3,714,540 A | 1/1973 | Galloway | |
| 3,760,198 A | 9/1973 | Mori et al. | |
| 3,763,472 A | 10/1973 | Sharp | |
| 3,798,608 A | 3/1974 | Huebner | |
| 3,808,673 A | 5/1974 | Bottini | |
| 3,863,244 A * | 1/1975 | Lichtblau | 340/572.3 |
| 4,024,452 A | 5/1977 | Seidel | |
| 4,027,152 A | 5/1977 | Brown et al. | |
| 4,040,100 A * | 8/1977 | Chan | 360/43 |
| 4,118,603 A | 10/1978 | Kumhyr | |
| 4,159,431 A | 6/1979 | Roozenbeek et al. | |
| 4,227,045 A | 10/1980 | Chelcun et al. | |
| 4,275,404 A | 6/1981 | Cassiday et al. | |
| 4,302,807 A | 11/1981 | Mentler | |
| 4,339,823 A * | 7/1982 | Predina et al. | 375/294 |
| 4,538,136 A | 8/1985 | Drabing | |
| 4,547,961 A | 10/1985 | Bokil et al. | |
| 4,554,462 A | 11/1985 | Komiya et al. | |
| 4,660,014 A | 4/1987 | Wenaas et al. | |
| 4,703,283 A | 10/1987 | Samuels | |
| 4,703,478 A * | 10/1987 | Haselton et al. | 370/397 |
| 4,748,419 A | 5/1988 | Somerville | |
| 4,772,963 A | 9/1988 | Van Lahr et al. | |
| 4,780,795 A | 10/1988 | Meinel | |
| 4,785,345 A | 11/1988 | Rawls et al. | |
| 4,799,236 A * | 1/1989 | Janssen | 375/258 |
| 4,817,865 A | 4/1989 | Wray | |
| 4,818,855 A | 4/1989 | Mongeon et al. | |
| 4,825,450 A | 4/1989 | Herzog | |
| 4,835,486 A | 5/1989 | Somerville | |
| 4,859,877 A | 8/1989 | Cooperman et al. | |
| 4,885,582 A | 12/1989 | LaBarge et al. | |
| 4,922,883 A | 5/1990 | Iwasaki | |
| 4,924,210 A | 5/1990 | Matsui et al. | |
| 4,937,468 A | 6/1990 | Shekhawat et al. | |
| 4,945,264 A | 7/1990 | Lee et al. | |
| 4,959,631 A | 9/1990 | Hasegawa et al. | |
| 5,025,459 A * | 6/1991 | Lill | H04L 7/06 370/305 |
| 5,041,780 A | 8/1991 | Rippel | |
| 5,055,722 A * | 10/1991 | Latos et al. | 327/379 |
| 5,057,968 A | 10/1991 | Morrison | |
| 5,095,357 A | 3/1992 | Anoh et al. | |
| 5,102,040 A | 4/1992 | Harvey | |
| 5,128,729 A | 7/1992 | Alonas et al. | |
| 5,142,432 A | 8/1992 | Schneider | |
| 5,164,621 A | 11/1992 | Miyamoto et al. | |
| 5,204,551 A | 4/1993 | Bjornholt | |
| 5,270,882 A | 12/1993 | Jove et al. | |
| 5,293,400 A | 3/1994 | Monod et al. | |
| 5,334,882 A | 8/1994 | Ting | |
| 5,353,001 A | 10/1994 | Meinel et al. | |
| 5,369,666 A | 11/1994 | Folwell et al. | |
| 5,384,808 A | 1/1995 | Van Brunt et al. | |
| 5,396,394 A | 3/1995 | Gee | |
| 5,418,353 A * | 5/1995 | Katayama et al. | 235/380 |
| 5,467,607 A | 11/1995 | Harvey | |
| 5,469,098 A | 11/1995 | Johnson, Jr. | |
| 5,484,012 A | 1/1996 | Hiratsuka | |
| 5,499,176 A | 3/1996 | Erisman | |
| 5,533,054 A | 7/1996 | DeAndrea et al. | |
| 5,539,241 A | 7/1996 | Abidi et al. | |
| 5,539,598 A | 7/1996 | Denison et al. | |
| 5,572,179 A | 11/1996 | Ito et al. | |
| 5,588,021 A | 12/1996 | Hunt et al. | |
| 5,596,466 A | 1/1997 | Ochi | |
| 5,650,357 A | 7/1997 | Dobkin et al. | |
| 5,701,037 A | 12/1997 | Weber et al. | |
| 5,714,938 A | 2/1998 | Schwabl | |
| 5,716,323 A | 2/1998 | Lee | |
| 5,731,762 A * | 3/1998 | Gila et al. | 340/10.42 |
| 5,731,954 A | 3/1998 | Cheon | |
| 5,774,791 A | 6/1998 | Strohallen et al. | |
| 5,781,071 A | 7/1998 | Kusunoki | |
| 5,781,077 A | 7/1998 | Leitch et al. | |
| 5,786,979 A | 7/1998 | Douglass | |
| 5,793,272 A | 8/1998 | Burghartz et al. | |
| 5,801,602 A | 9/1998 | Fawal et al. | |
| 5,812,598 A | 9/1998 | Sharma et al. | |
| 5,825,259 A | 10/1998 | Harpham | |
| 5,831,426 A | 11/1998 | Black, Jr. et al. | |
| 5,831,525 A | 11/1998 | Harvey | |
| 5,877,667 A | 3/1999 | Wollesen | |
| 5,900,683 A | 5/1999 | Rinehart et al. | |
| 5,926,358 A | 7/1999 | Dobkin et al. | |
| 5,942,937 A | 8/1999 | Bell | |
| 5,952,849 A | 9/1999 | Haigh | |
| 5,969,590 A | 10/1999 | Gutierrez | |
| 5,990,753 A | 11/1999 | Danstrom et al. | |
| 6,054,780 A | 4/2000 | Haigh et al. | |
| 6,069,802 A | 5/2000 | Priegnitz | |
| 6,087,882 A | 7/2000 | Chen et al. | |
| 6,091,779 A * | 7/2000 | Griessbach | 375/258 |
| 6,097,273 A | 8/2000 | Frye et al. | |
| 6,104,003 A | 8/2000 | Jones | |
| 6,114,937 A | 9/2000 | Burghartz et al. | |
| 6,124,756 A | 9/2000 | Yaklin et al. | |
| 6,154,498 A | 11/2000 | Debral et al. | |
| 6,249,171 B1 | 6/2001 | Yaklin et al. | |
| 6,262,600 B1 | 7/2001 | Haigh et al. | |
| 6,291,907 B1 | 9/2001 | Haigh et al. | |
| 6,501,363 B1 | 12/2002 | Hwu et al. | |
| 6,525,566 B2 | 2/2003 | Haigh et al. | |
| 6,593,841 B1 * | 7/2003 | Mizoguchi et al. | 336/200 |
| 6,670,827 B2 | 12/2003 | Strzalkowski | |
| 6,720,816 B2 | 4/2004 | Strazalkowski | |
| 6,728,320 B1 | 4/2004 | Khasnis et al. | |
| 6,853,685 B1 | 2/2005 | Konrad | |
| 6,873,065 B2 | 3/2005 | Haigh et al. | |
| 6,901,111 B2 | 5/2005 | Miller et al. | |
| 6,903,578 B2 | 6/2005 | Haigh et al. | |
| 6,911,860 B1 | 6/2005 | Wang et al. | |
| 6,922,080 B2 | 7/2005 | Haigh et al. | |
| 6,927,662 B2 | 8/2005 | Kahlmann et al. | |
| 6,985,510 B2 * | 1/2006 | Willenegger | H04B 1/707 370/522 |
| 7,064,442 B1 * | 6/2006 | Lane et al. | 257/773 |
| 7,075,329 B2 * | 7/2006 | Chen et al. | 326/21 |
| 7,233,224 B2 | 6/2007 | Strzalkowski | |
| 7,376,212 B2 | 5/2008 | Dupuis | |
| 7,421,028 B2 * | 9/2008 | Dupuis | 375/258 |
| 7,489,526 B2 | 2/2009 | Chen | |
| 8,095,007 B2 * | 1/2012 | Lin | H04J 14/0212 398/83 |
| 2002/0105406 A1 * | 8/2002 | Liu et al. | 336/200 |
| 2003/0042571 A1 | 3/2003 | Szostkiewicz et al. | |
| 2003/0052712 A1 | 3/2003 | Comer | |
| 2003/0189984 A1 | 10/2003 | Komatus et al. | |
| 2005/0272378 A1 | 12/2005 | Dupuis | |
| 2006/0021088 A1 | 1/2006 | Inze et al. | |
| 2006/0109072 A1 * | 5/2006 | Giandalia et al. | 336/200 |
| 2006/0250155 A1 | 11/2006 | Chen et al. | |
| 2007/0081280 A1 | 4/2007 | Strzalkowski | |

FOREIGN PATENT DOCUMENTS

| | | |
|---|---|---|
| DE | 19718420 A1 | 11/1998 |
| DE | 100 14 269 A1 | 3/2000 |
| DE | 19922129 C1 | 9/2000 |
| DE | 19922123 A1 | 11/2000 |
| DE | 19922127 A1 | 11/2000 |

(56) References Cited

FOREIGN PATENT DOCUMENTS

| | | |
|---|---|---|
| DE | 19922128 C1 | 1/2001 |
| DE | 10100282 A1 | 7/2002 |
| DE | 10243197.3 | 9/2002 |
| DE | 10205705 | 5/2003 |
| DE | 10335082 | 2/2005 |
| DE | 10228543 | 11/2005 |
| EP | 0282102 A2 | 9/1988 |
| EP | 0307345 A1 | 3/1989 |
| EP | 0348758 | 3/1990 |
| EP | 0198263 B1 | 1/1992 |
| EP | 0586062 A1 | 3/1994 |
| EP | 0 714 131 A1 | 11/1995 |
| EP | 0749227 A2 * 12/1996 ........... H04L 25/493 |
| EP | 0 801 468 A2 | 4/1997 |
| EP | 917309 A2 | 5/1999 |
| EP | 0977406 A1 | 2/2000 |
| EP | 1052780 | 8/2003 |
| FR | 2679670 B1 | 10/1993 |
| GB | 2173956 A | 10/1986 |
| JP | 57132460 | 8/1982 |
| JP | 58215833 A2 | 12/1983 |
| JP | 2002044162 | 8/2002 |
| WO | WO 8912366 A1 | 12/1989 |
| WO | WO 91/14327 | 9/1991 |
| WO | WO 9520768 A1 | 8/1995 |
| WO | WO 9837672 A1 | 8/1998 |
| WO | WO 9848541 A2 | 10/1998 |
| WO | WO 9921332 A1 | 10/1998 |
| WO | WO 0128094 A1 | 4/2001 |
| WO | WO 0161951 A1 | 8/2001 |
| WO | WO 02073914 | 9/2002 |
| WO | WO 02086969 A3 | 10/2002 |

OTHER PUBLICATIONS

"http://en.wikipedia.org/wiki/Galvanic_isolation," Galvanic isolation—Wikipedia, the free encyclopedia, Sep. 2, 2008, 2 pages.
"The Dilettante's Dictionary," search-transformer, Oct. 13, 2008, 1 page.
"Electricity, Electronics, and Electromagnetics Principles and Applications," Robert Boylestad and Louis Nashelsky, 1977, p. 164, 4 pages.
Strzalkowki, An Energy-efficient, single-channel signal transfer method. DE Munich, 2001P18573 US01, Oct. 2002.
U.S. Appl. No. 10/834,959.
U.S. Appl. No. 12/005,675.
U.S. Appl. No. 11/481,997.
German Office Action, Application No. 10262239.6-31, Applicant: Infineon Technologies AG, dated Feb. 19, 2009.
United States District Court, District of Massachusetts (Boston), Civil Docket for Case No. 1:06-cv-12240-WGY, *Analog Devices, Inc. v. Silicon Laboratories, Inc.*, 25 pages, filed Dec. 14, 2006.
Analog Devices, iCoupler Isolation Technology, *The World Leader in High Performance Signal Processing Solutions*, pp. 1-27, Mar. 2007.
U.S. Appl. No. 12/009,766.
U.S. Appl. No. 10/834,959, Applicant: Chen, PTO 1449 forms filed Apr. 19, 2006 and Sep. 2, 2005 (6 pages).
U.S. Appl. No. 12/005,675, Applicant: Chen, PTO 1449 form filed Jun. 4, 2009 (2 pages).
U.S. Appl. No. 11/481,997, Applicant: Chen, PTO 1449 forms Feb. 6, 2009, Mar. 24, 2008, Nov. 2, 2007 and Jul. 10, 2007 (82 pages).
Herzer, Pawel, Lehmann: "IGBT Driver Chipset for High Power Applications" in Proceedings of the 14$^{th}$ International Symposium on Power Semiconductor Devices and ICs, 2002, ISBN; 0-7803-7318-9, Aug. 7, 2002.
Tang et al.: "A Low Profile Low-Power Converter with Coreless PCB Isolation Transformer", IEEE Transactions on Power Electronics, vol. 16, No. 3, May 2001.
Tietze, Schenk (in German): "Monolith Technology" Edition No. 9, Springer Publishing, Berlin 1991, ISBN: 3-540-19475-4, with English translation of pp. 232-240.
German Office Action dated Mar. 12, 2015 in Patent Application No. 102 62 358.9.
Zhou, Jianjun J., et al., "Monolithic Transformers and Their Application in a Differential CMOS RF Low-Noise Amplifier", IEEE Journal of Solid State Circuits, vol. 33, No. 12, pp. 2020-2027(Dec. 1998).
Geen, M.W., et al., "Miniture Multilayer Spiral Inductors for GaAs MMICs", IEEE GaAs IC Symposium, pp. 303-306 (1989).
Kester W., "Practical Design Techniques for Sensor Signal Conditioning", Analog Devices, Inc., pp. 10.55-10.57 (1999).
Bourgeois, J.M. "PCB Based Transformer for Power Mosfet Drive", IEEE, pp. 238-244 (1994).
Sayani et al., "Isolated Feedback for Off-Line Switching Power Supplies with Primary-Side Control", IEEE pp. 203-211 (1998).

* cited by examiner

DIGITAL SIGNAL TRANSFER USING INTEGRATED TRANSFORMERS WITH ELECTRICAL ISOLATION

RELATED U.S. APPLICATION DATA

The present application is a continuation of application Ser. No. 10/666,221, filed Sep. 18, 2003, the disclosure of which is hereby incorporated by reference.

FOREIGN APPLICATION PRIORITY DATA

The present application claims priority to German patent application no. DE10243197.3, filed Sep. 18, 2002, the disclosure of which is hereby incorporated by reference.

FIELD OF THE INVENTION

The present invention relates to a digital signal transfer method, particularly for transferring a digital signal via a potential barrier.

BACKGROUND OF THE INVENTION

The transfer of digital control signals and data signals via a potential barrier is frequently necessary in electrical installations in order to electrically isolate different circuits, for example, a circuit which produces a control signal and a circuit which processes the control signal, from one another. To reduce the number of coupling points between such circuits, which are to be electrically isolated, and data lines, serial transfer methods are frequently used. Thus, by way of example, microcontrollers (µC) use interfaces of the RS-485 type or use SPI (Serial Parallel Interface) interfaces to communicate with circuit components that are to be actuated. In this context, it is desirable to transfer data at a high transfer rate and to isolate potentials between the microcontroller and the circuits that are to be actuated. In addition, the transfer method needs to be highly immune to interference.

For data transfer with electrical isolation between a transmitter circuit and a receiver circuit, it is known practice to use transformers, particularly planar transformers integrated on an IC, as described in Published German Patent Application 101 00 282 A1, for example, as data couplers. To transfer signals using such transformers, it is necessary to convert the signals into pulse trains that are suitable for transfer, and it is known practice, for example, to produce cyclic pulse trains from a binary control signal and to transfer them, as described in U.S. Pat. Nos. 4,027,152, 4,748,419, 5,952,849 and 6,262,600, for example.

Planar transformers integrated in an integrated circuit, which are also called coreless transformers, are capable of transferring data at a speed of up to 1 Gbaud, where not just the high data transfer speed, but also the low power consumption with good immunity to interference make such transformers attractive as coupling modules in data transfer links.

SUMMARY OF THE INVENTION

It is accordingly an object of the invention to provide a digital signal transfer method that overcomes the above-mentioned disadvantages of the prior art methods of this general type. In particular, it is an object of the invention to provide a fast and secure data transfer method, particularly a transfer method that is suitable for data transfer using integrated transformers as coupling modules.

Preferably, the data signal time window within which data signals are transferred starts after a period which is greater than zero after the announcement signal. By way of example, the announcement signal includes just a single pulse, and the data signal time window does not start until after the end of this announcement pulse.

In one embodiment of the invention, a further transfer channel is provided which is used to transfer control information. Such control information includes a parity check signal or a transfer check signal, for example. Preferably, the data signal is transferred within the respective data signal time window in coded form in order to increase redundancy and hence to increase immunity to interference further, and any coding methods which increase redundancy can be used for this. In the simplest case, a data pulse or a data pulse train is repeated within the data signal time window, that is to say is transferred a plurality of times at successive times.

The inventive method is also suitable for transferring a binary signal that has a first or a second signal level. Such signal profiles, in which a signal assumes a first signal level or a second signal level over a comparatively long period, which is much longer than the data signal time window, are typical of control signals, for example turn-on and turn-off signals for loads, which need to be transferred in electrical installations with isolation of potentials. In one embodiment of the inventive method for transferring such control signals, provision is made for announcement pulses to be transferred at regular intervals of time and for respective pulse trains that represent the first or the second signal level to be transferred during the data signal time windows which follow the announcement signals. In the simplest case, a pulse is transferred during the data signal time window when the control signal assumes a first signal level, and no pulse is transferred when the control signal assumes a second signal level. The transfer, repeated at cyclic intervals of time, of pulse trains which represent the signal level of the control signal helps to increase immunity to interference during the transfer of such control signals, since even if interference arises during a data signal time window and makes data transfer impossible, the data signal is transferred during one of the subsequent data signal time windows, after the interference has declined.

With the foregoing and other objects in view there is also provided, in accordance with the invention, a digital signal transfer method that includes providing a transfer channel. An announcement signal including at least one pulse is transmitted via the transfer channel. A data signal is also transmitted via the transfer channel within a data signal time window lasting for a prescribed period after the announcement signal.

Other features which are considered as characteristic for the invention are set forth in the appended claims.

Although the invention is illustrated and described herein as embodied in a digital signal transfer method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Unless otherwise indicated, the same reference symbols denote the same circuit components and signals having the same meaning in the figures.

Figure 1:
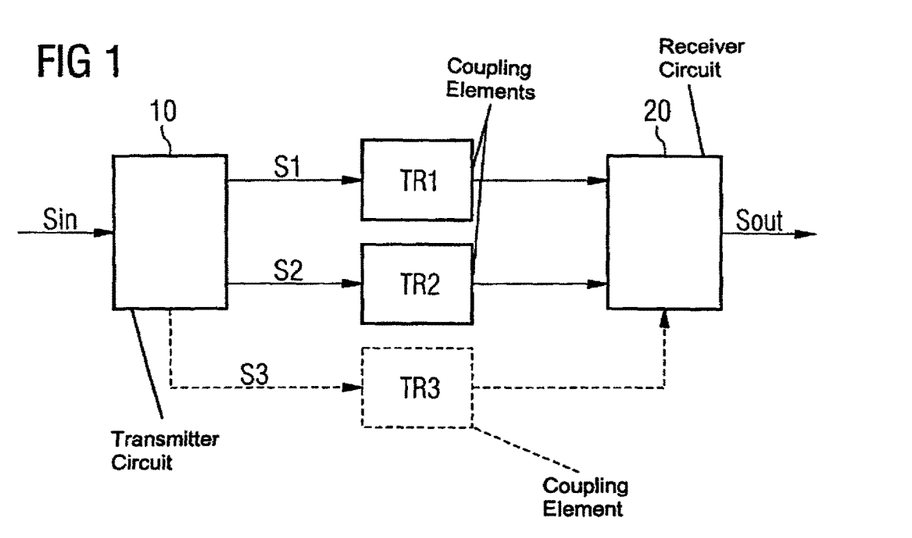
FIG. 1 is a block diagram of a data transfer link having two transfer channels that each include a coupling element for isolating potentials in a transmitter circuit and a receiver circuit.

Referring now to the figures of the drawing in detail and first, particularly, to FIG. 1 thereof, there is schematically shown a data transfer link with a transmitter circuit 10, to which an input signal Sin is supplied, and a receiver circuit 20 which provides an output signal Sout which is dependent on the input signal Sin. The data transfer link also includes a first transfer channel with a coupling element TR1 and a second transfer channel with a second coupling element TR2. The coupling elements TR1, TR2 preferably each include an integrated transformer for isolating the potentials of the transmitter circuit 10 and the receiver circuit 20.

In the case of the transfer link shown, the first transfer channel is used as an announcement channel to transfer an announcement signal S1 when data transfer needs to take place. The second transfer channel is used as the actual data channel to transfer the actual data signal containing the useful information to the receiver. Both the announcement signal S1 and the data signal S2 are individual pulses or pulse trains that are generated by the transmitter circuit 10. The length of the individual pulses is matched to the transfer properties of the coupling elements TR1, TR2 in order for these pulses to be transferred optimally on interference-free channels. As is sufficiently well known, each of the transformers TR1, TR2 includes a primary coil which is excited by the signal S1 or S2 generated by the transmitter circuit 10. The magnetic coupling of the primary coil and the secondary coil mean that the transmitter-end pulse trains result in corresponding receiver-end pulse trains that are detected by the receiver circuit 20.

Figure 2:
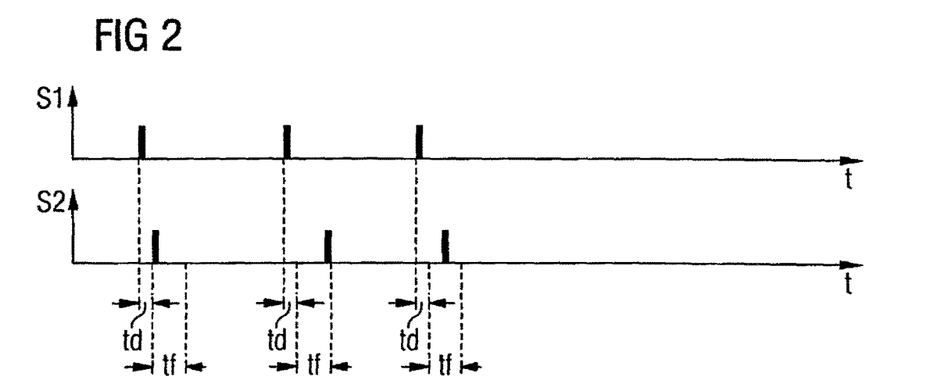
FIG. 2 is a diagram showing exemplary signal profiles of signals on the first and second transfer channels.

FIG. 2 fundamentally shows the signal profiles for the announcement signal S1 and the data signal S2 in the inventive method. The method provides for the first transfer channel, which serves as the announcement channel, to be used to transfer an announcement signal S1. The method also includes transferring a pulse or a pulse train for the data signal within a respective time window lasting for a prescribed period after a pulse or a pulse train for the announcement signal. In the example shown in FIG. 1, the announcement signal transferred via the announcement channel is a respective individual announcement pulse. A period td after the start of the announcement pulse is followed by the start of a time window, lasting for a period tf, within which the data signal is transferred. The data signal includes just one data pulse per time window in the example shown in FIG. 2. The period td after which the data signal time window starts is longer in this case than the pulse length of the announcement pulse, which means that the time window does not start until after the end of the announcement pulse, as a result of which the announcement pulses and the data pulses following the announcement pulses within the time windows are transferred at different times from one another, resulting in immunity to interference when using the method.

The data pulse train transferred during the data signal time window can contain the information that is to be transferred in virtually any manner. Thus, by way of example, just one pulse can be transferred during a data signal time window such that the information which is to be transferred is held in the period, for example, by which this pulse is additionally shifted with respect to the start of the data signal time window. In addition, a plurality of, for example n, pulses representing that single bits of a data word of a length of n bits to be transferred, can be transferred during a data signal time window.

The transmitter and the receiver are synchronized in the inventive method by virtue of the shape of the announcement signal generated by the transmitter, the period for which the data signal time window lasts, and also because the interval of time between the announcement signal and the data signal time window is known at the receiver. Whenever an announcement signal is received, this results in the receiver taking the known information about the period for which the data signal time window lasts and the latter's distance from the announcement signal as a basis for producing a time window within which pulses which are received on the data channel at the receiver are accepted as a data signal.

If the transmitter circuit 10 contains a coder which codes the signal transferred within the data signal time windows, the receiver circuit contains a corresponding decoder which provides the output signal Sout from the signals received via the data channel within the data signal time windows.

Figure 3A:
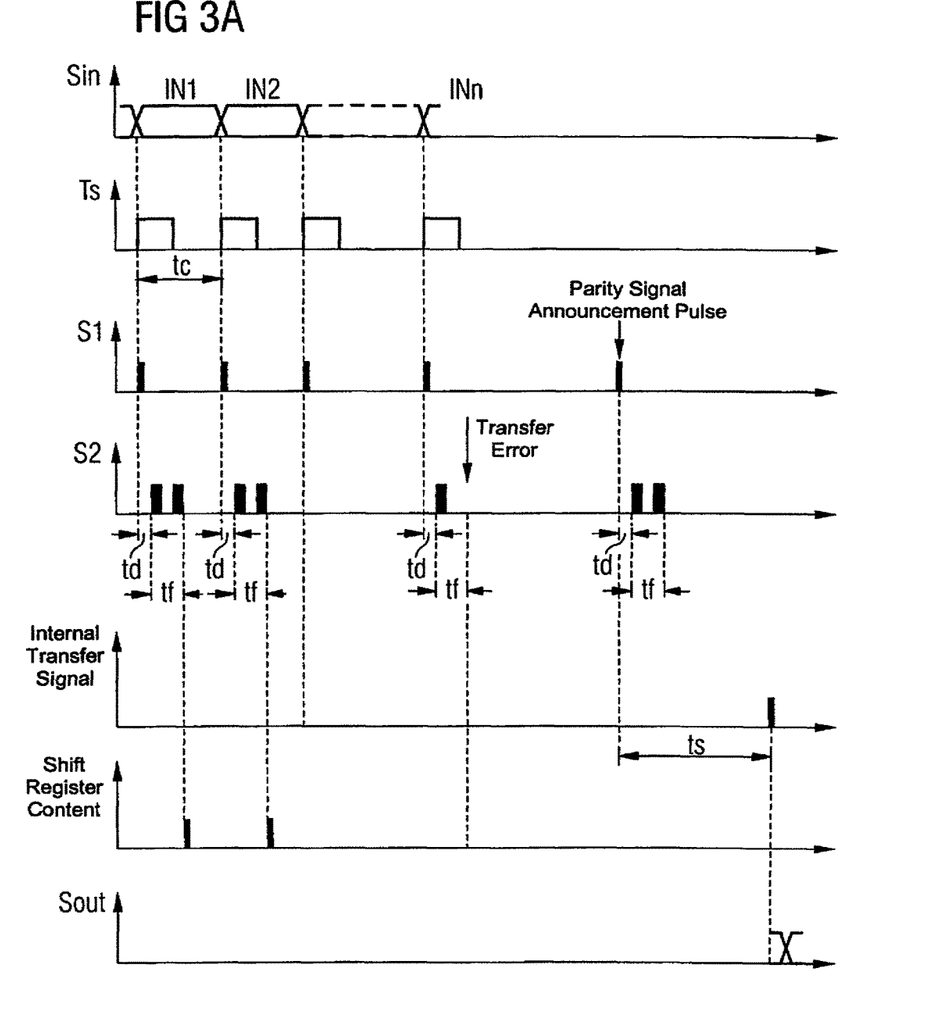
FIG. 3A is a diagram showing exemplary signal profiles of signals, on the first and second transfer channels and also time profiles for selected internal signals in a transmitter circuit and a receiver circuit, which occur in one embodiment of a transfer method.
Figure 3B:
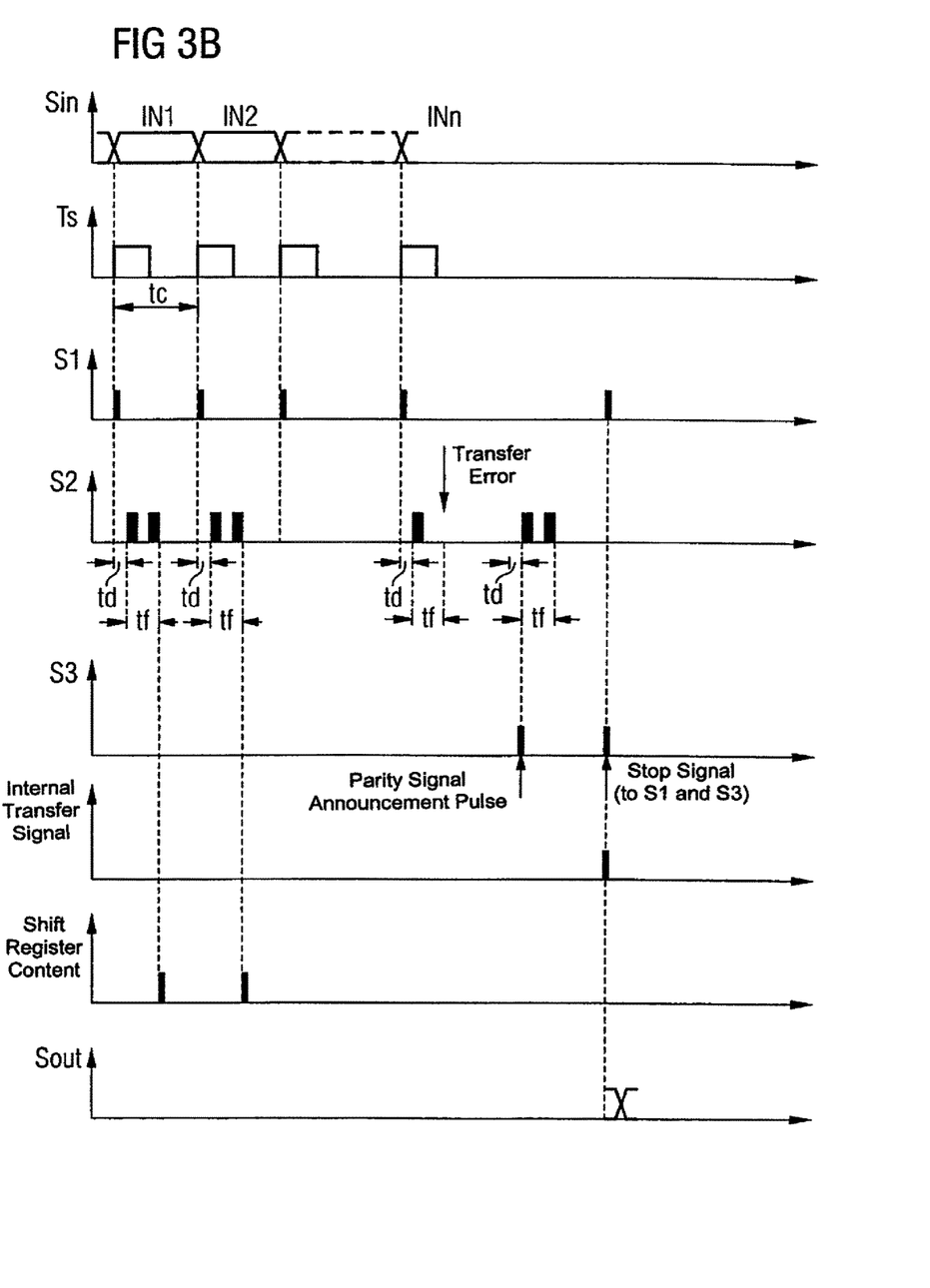
FIG. 3B is a diagram showing exemplary signal profiles of signals, on the first and second transfer channels and also on a third channel that is used as control information channel, which occur in a modification of the method.

FIGS. 3A and 3B illustrate an exemplary embodiment of the inventive method, in which announcement pulses in the announcement signal S1 are generated cyclically in time with a clock signal Ts having a clock period tc. In time with this clock signal, an input signal Sin is also available which is shown by way of example as a binary signal whose level can change in time with the clock signal Ts. Such signals appear at the outputs of shift registers, for example. The information about the current level of the input signal Sin is transferred in data signal time windows of length tf. The start of these data signal time windows respectively come a period td after the start of an announcement pulse. The signal level of the input signal Sin is converted into the pulses transferred during the data signal time window by virtue of transferring two pulses at successive times in the data signal time window for a first level, for example, an upper level, of the input signal Sin, while no pulses are generated and transferred during the time window for a second level, for example, a lower level, of the input signal Sin. The transfer of two successive pulses serves for redundancy and hence to increase the immunity to interference.

The receiver circuit 20 contains a shift register. The content of this shift register is shown in FIG. 3A. This shift register has a logic one written to it whenever two pulses are detected during the data signal time window. In the case of the fourth data signal time window shown in FIGS. 3A and 3B, there is a transfer error, because only one pulse is being transferred instead of two pulses. This one pulse is not sufficient for a logic one to be written to the shift register. If no pulses are transferred during a data signal time window after an announcement pulse, a logic zero is written to the shift register.

In the method shown in FIG. 3A, provision is also made for a parity signal announcement pulse to be transferred via the announcement channel and for the associated parity signal to be transferred via the data channel within a data signal time window lasting for the period tf. This method involves the stipulation that every nth pulse of the announcement signal S1 is an announcement pulse for a parity signal or that a parity signal is transferred during every nth data signal time window. For the data transfer of 8-bit data words, every ninth announcement pulse is an announcement pulse for a parity signal.

In the case of the method shown in FIG. 3A, the receiver 20 generates an internal transfer signal after a period is after the parity signal announcement pulse. The internal transfer signal governs the reading of the shift register described above for the purpose of generating the output signal Sout, provided that the parity check performed on the basis of the parity signal delivers a correct result.

FIG. 3B shows a modification of the method shown in FIG. 3A in which a third transfer channel is provided, which is shown in dashes in FIG. 1 and which likewise has a coupling element, preferably a magnetic coupling element, used to transfer a parity signal announcement pulse whenever the transfer of a data word has ended. Additionally, a parity signal is transferred via the data channel during a data signal time window lasting for the period tf after this parity signal announcement pulse. The provision of a separate channel for the parity signal announcement pulse reduces the system's susceptibility to interference and also makes the system more flexible for transferring data words of different length. Hence, a parity check is not performed until a parity signal announcement pulse is received on the further channel.

The method shown in FIG. 3B also has provision for the further channel to be used to transfer a stop pulse which governs the generation of the internal transfer signal, which in turn governs the reading of the shift register to which the data from the data channel have previously been written. To increase immunity to interference, a pulse is transferred on the announcement channel, preferably simultaneously with the stop pulse. An internal transfer signal for reading the shift register and for outputting the output signal Sout is produced at the output of the receiver 20 only when the receiver receives the stop pulse and the pulse on the announcement channel.

Figure 4:
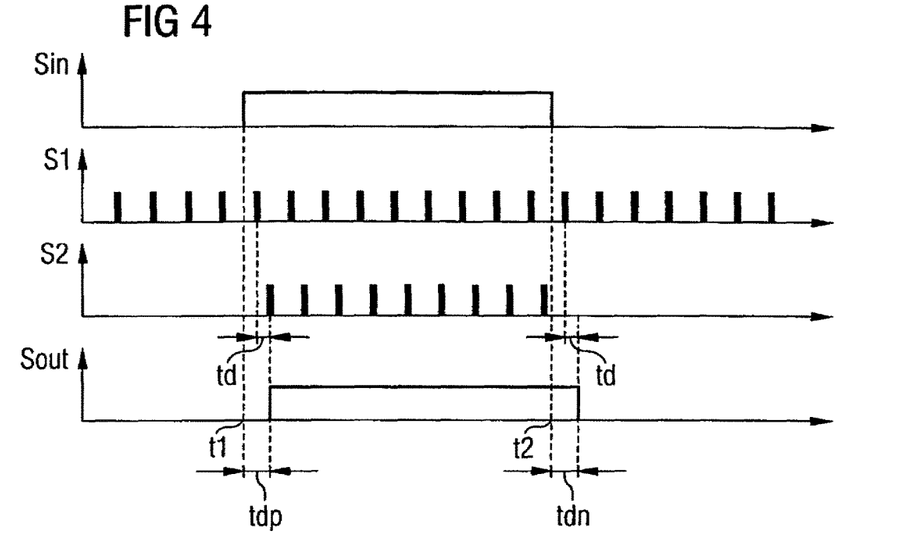
FIG. 4 is a diagram showing selected signal profiles for a method for transferring a binary control signal with regular announcement pulses.

FIG. 4 illustrates an exemplary embodiment of a method for transferring the information contained in a control signal Sin. The control signal Sin is a binary signal which assumes an upper or a lower level. The respective level is present for a period which is normally much longer than the period for which a data signal time window lasts. For transferring such a signal, provision is made for the announcement channel to be used to transfer announcement pulses at regular intervals of time and to transfer at least one pulse containing information about the current signal level of the control signal Sin within data signal time windows, lasting for the period tf, the start of which respectively comes a period td after the start of an announcement pulse. In the exemplary embodiment shown in FIG. 4, a pulse is transferred within the time window tf when the input signal Sin assumes an upper signal level, and no pulse is transferred within the data signal time window when the input signal Sin assumes a lower signal level.

The inventive method thus involves transferring pulses that indicate the current level of the input signal Sin at regular intervals of time. The result of this is a high level of immunity to interference, since even if interference arises during one or more data signal time windows, a correct pulse is transferred sooner or later.

In the signal profile shown in FIG. 4, the input signal Sin changes from a lower level to an upper level at a time t1. The information about this level change is transferred with a time delay after a period tdp in the method. This period tdp results from the interval of time td between the announcement pulse and the data signal time window and from the interval of time between the level change in the input signal Sin and the announcement pulse. Accordingly, a delay tdn is produced when the signal level changes from an upper level to a lower level of the input signal Sin, which accordingly results from a delay time between the time t2 at which the level change takes place and the time of the next announcement pulse and from the interval of time td between the announcement pulse and the data signal time window to which the information about the level change which has taken place is transferred.

Figure 5:
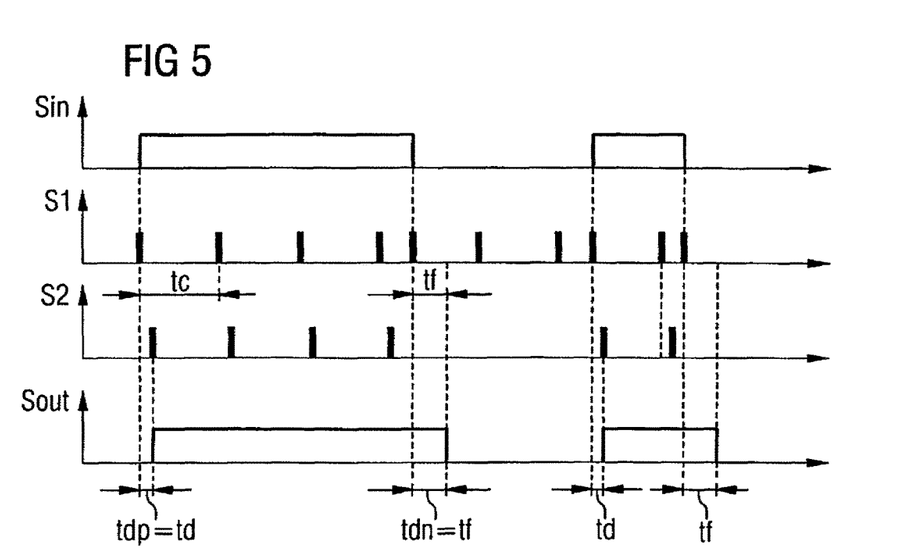
FIG. 5 is a diagram showing selected signal profiles for a method for transferring a binary control signal with event-controlled announcement pulses.
Figure 6:
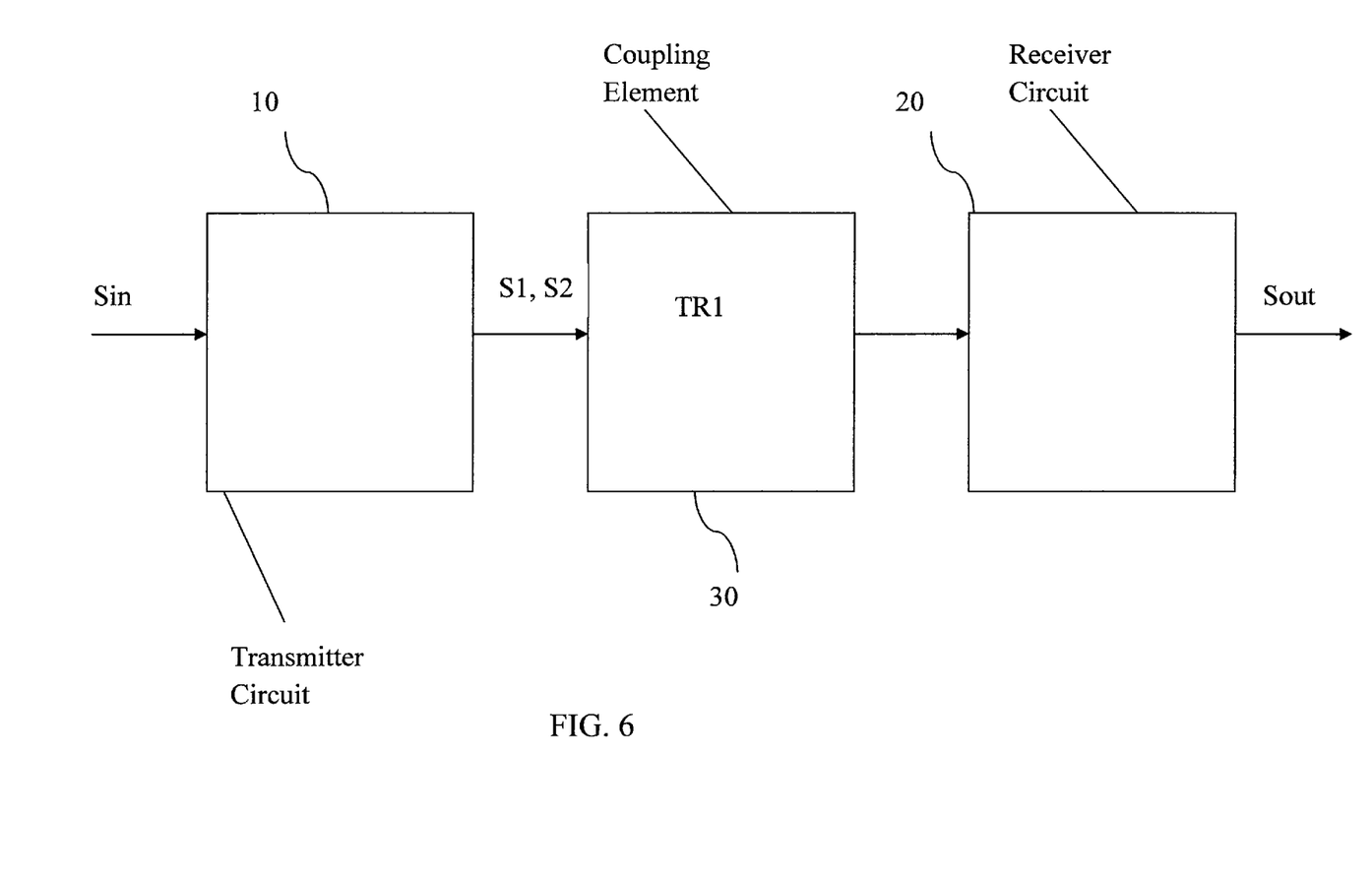
FIG. 6 illustrates generally one embodiment of a transformer adapted to transfer data via a signal transfer channel according to various aspects of the invention discussed herein.
Figure 7:
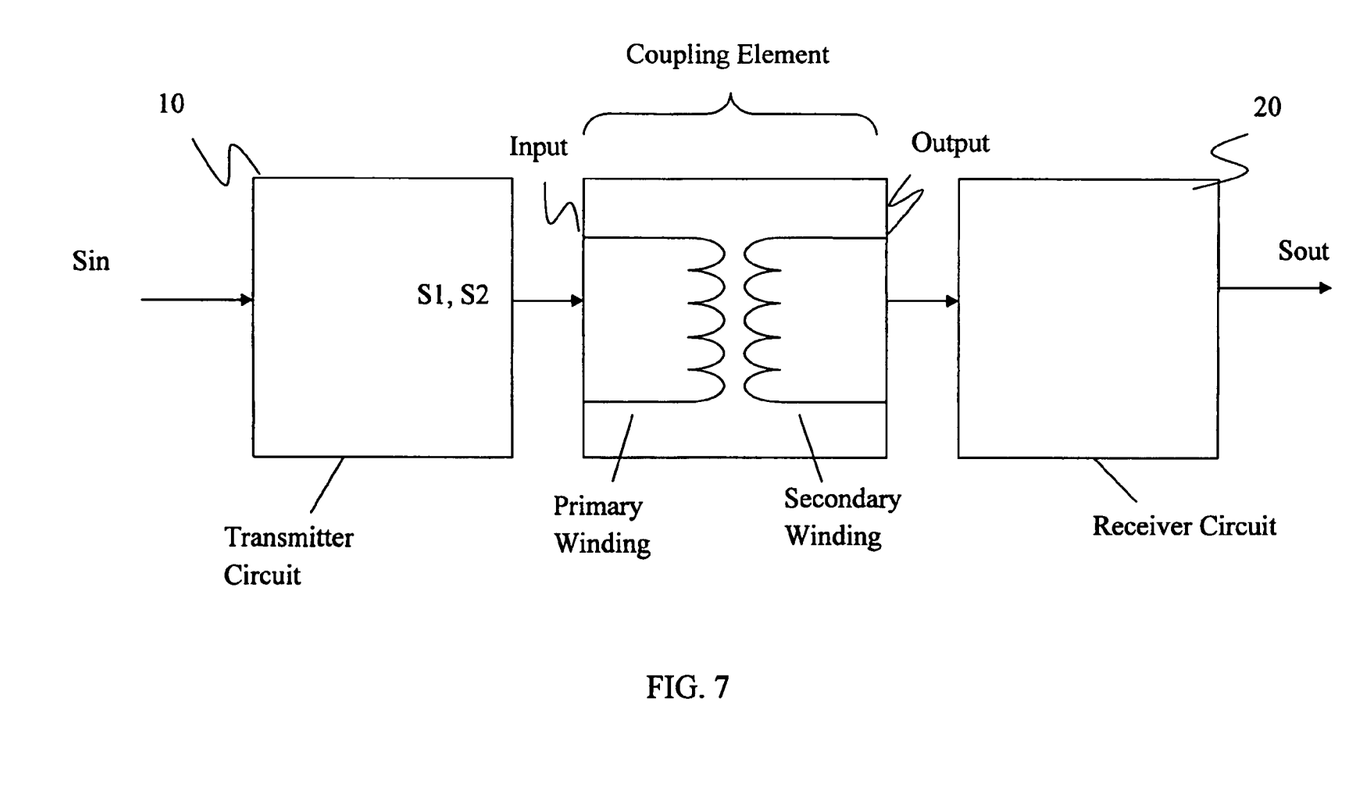
FIG. 7 illustrates generally one embodiment of a transformer adapted to transfer data via a single transfer channel according to various aspects of the invention discussed herein.

FIG. 5 illustrates a modification to the method for transferring a binary signal Sin which is explained with reference to FIG. 4. This method involves first generating the announcement pulses cyclically, as can be seen, in particular, from the first time period, during which the signal assumes a high level. In addition, the announcement pulses are generated on an event-controlled basis when there is a level change in the input signal Sin, in order to reduce the delay time between the level change and the data signal's pulse which represents this level change as compared with the method in FIG. 4. From the time profile for the announcement signal S1 in FIG. 5, it becomes clear that, besides the cyclically recurring announcement pulses, further announcement pulses are present whose appearance is dependent on a level change in the input signal Sin. The delay time which elapses during this method in line with FIG. 5 between a rising edge of the input signal Sin and the transmission of a useful pulse which represents this edge corresponds essentially to the period td, provided that the useful pulse is transferred immediately at the start of the data signal time window. The maximum time delay between a level change in the input signal Sin and the output signal Sout is tdn=tp+tf, where tp is again the period between the start of an announcement pulse and a data signal time window, and tf is the length of the data signal time window.

This delay time arises when the signal level of the input signal changes from an upper signal level to a lower signal level. This information is transferred by not transferring a pulse during the data signal time window, which means that it is necessary to wait the length of this time window until the output signal Sout changes its level.

In the method explained up to now, announcement pulses S1 announcing a data transfer and data pulses S2 are transferred via physically separate channels TR1, TR2 in order to increase immunity to interference. If a reduction in the immunity to interference is acceptable, then one modification to the method explained up to now has provisions for the announcement pulses S1 and the data pulses S2 to be transferred via just one common channel 30 instead of via separate channels TR1, TR2 as depicted in FIGS. 6-10. In this case, the data pulses S2 are each transferred within a data signal time window of prescribed length which comes after an announcement pulse S1 in time, with, as in the case of the method explained previously, the receiver "accepting" only such data pulses that are transferred within the data signal time window after an announcement signal or announcement pulse.

In the case of this modification of the method, just one transformer is required, which means that the chip area required for implementing the transfer link and the associated transmitter and receiver circuits is reduced by up to 50% as compared with the method with two transfer channels.

Figure 8:
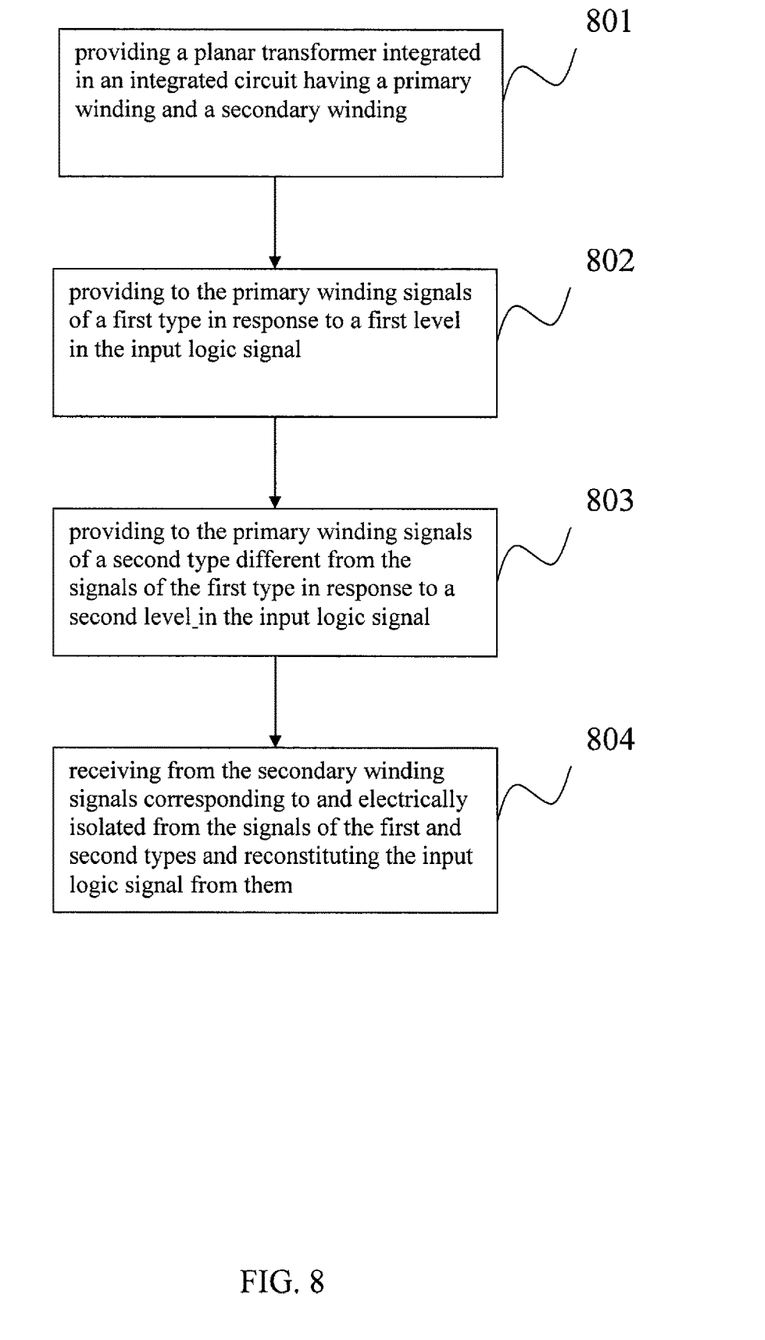
FIG. 8 illustrates generally one embodiment of a method of isolated signal transfer according to various aspects of the invention described herein.

FIG. 8 illustrates generally one embodiment of a method of providing an isolated logic signal output in response to an input logic signal according to various aspects of the invention described herein. At 801, a planar transformer integrated in an integrated circuit is provided having a primary winding and a secondary winding. At 802, signals of a first type are provided to the primary winding in response to a first level in the input logic signal. At 803, signals of a second type different from the signals of the first type are provided in response to a second level in the input logic signal. At 804, signals corresponding to and electrically isolated from the signals of the first and second types are received from the secondary winding, and the input logic signal is reconstituted from them.

Figure 9:
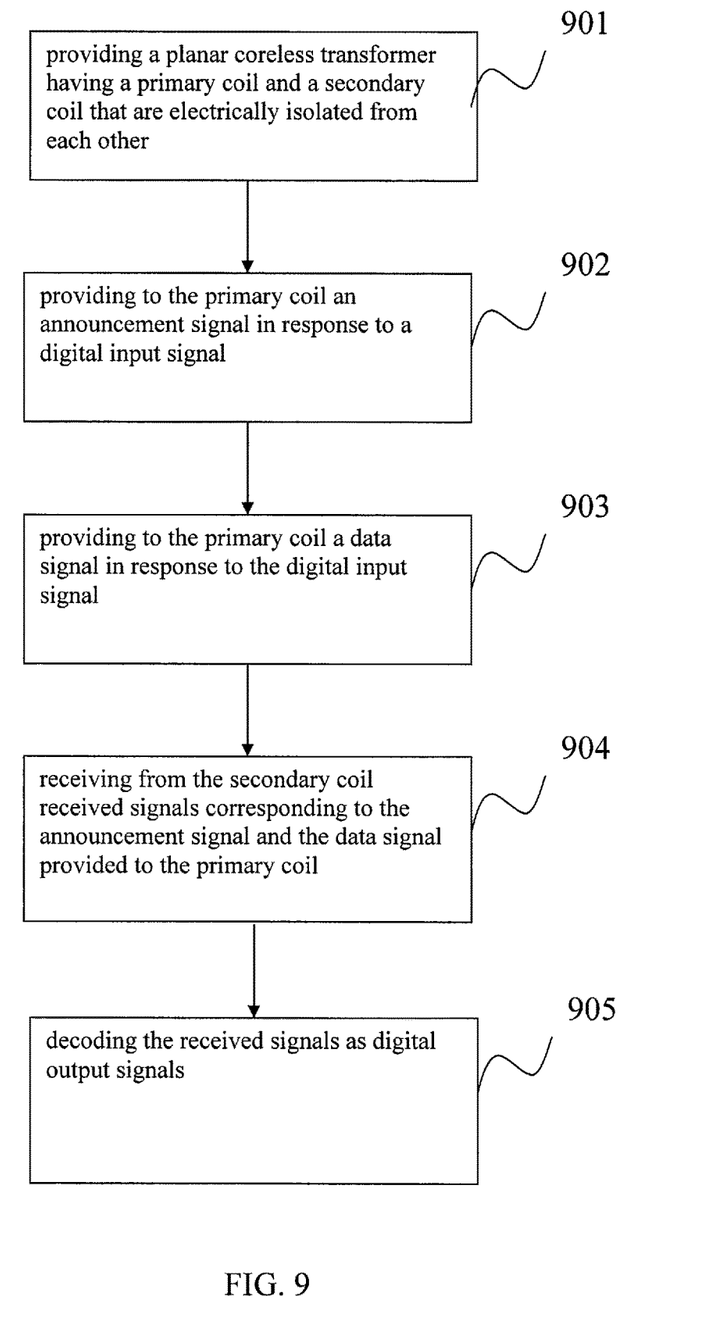
FIG. 9 illustrates generally one embodiment a method of isolated signal transfer according to various aspects of the invention described herein.
Figure 10:
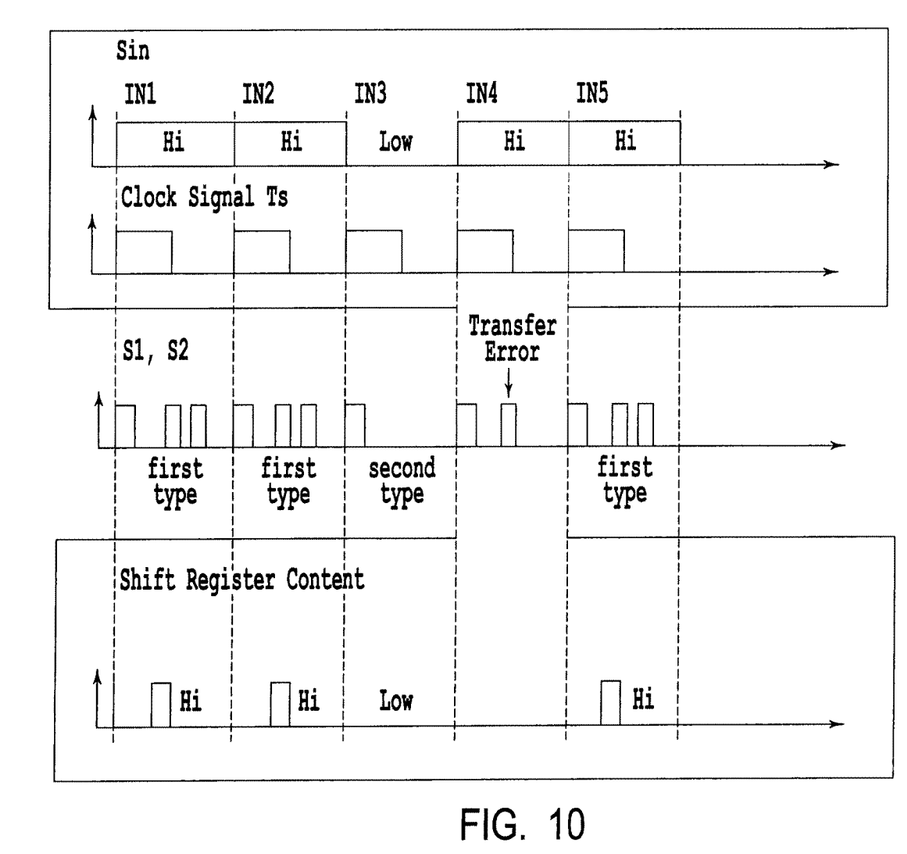
FIG. 10 is a diagram showing exemplary signal profiles of signals, on a single transfer channel and also time profiles for selected internal signals in a transmitter circuit and a receiver circuit, which occur in one embodiment of a transfer method.

FIG. 9 illustrates generally one embodiment of a method of isolated digital signal transfer according to various aspects of the invention described herein. At 901, a planar transformer having a primary coil and a secondary coil that are electrically isolated from each other are provided. At 902, announcement signals in response to a digital input signal are provided to the primary coil. At 903, a data signal in response to the digital input signal is provided to the primary coil. At 904, received signals corresponding to the announcement signal and the data signal provided to the primary coil are received from the secondary coil. At 905, the received signals are decoded as digital output signals.

The invention claimed is:

1. A digital logic signal isolator comprising:
  a coupling module forming an integrated planar transformer having one common transfer channel, the coupling module having an input electrically coupled to a first coupling point and an output electrically coupled to a second coupling point of the coupling module,
  a transmitter circuit which drives the input in response to a digital logic signal, such that in response to a first type of digital data value in the digital logic signal, a signal of a first predetermined type is supplied to the input and in response to a second type of digital data value in the digital logic signal, a signal of a second predetermined type is supplied to the input, the signals of the first type and the second type each including an initiation signal that announces a predetermined time window during which another portion of the signals representing a digital data value of the first type or the second type will be valid; and
  a receiver circuit coupled to the output to receive signals in correspondence to the signals provided to the input, the receiver circuit adapted to decode a received digital logic signal from the received signals,
  wherein the coupling module is configured to isolate potentials of the transmitter circuit and the receiver circuit.

2. The isolator of claim 1, wherein the receiver circuit is adapted to decode a data signal that includes a signal indicating a binary value in the digital logic signal or an absence of the signal indicating an opposite binary value in the digital logic signal.

3. A digital logic signal isolator comprising:
  a coupling module forming an integrated planar transformer having one common transfer channel, the coupling module having an input electrically coupled to a first coupling point and an output electrically coupled to a second coupling point of the coupling module;
  a transmitter circuit which drives the input in response to a digital logic signal, such that in response to a first level of digital data value in the digital logic signal, a signal of a first predetermined type is supplied to the input and in response to a second level of digital data value in the digital logic signal, a signal of a second predetermined type is supplied to the input, the signals of the first type and the second type each including an initiation signal that announces a predetermined time window during which another portion of the signals representing a digital data value of the first type or the second type will be valid; and
  a receiver circuit coupled to the output to receive signals in correspondence to the signals provided to the input, the receiver circuit adapted to decode a received digital logic signal from the received signals,
  wherein the transmitter circuit and the receiver circuit are electrically isolated.

4. The isolator of claim 3, wherein the receiver circuit is adapted to decode a data signal that includes a signal indicating a binary value in the digital logic signal or an absence of the signal indicating an opposite binary value in the digital logic signal.

5. A digital logic signal isolator comprising:
  a coupling module forming an integrated planar transformer having one common transfer channel, the coupling module having an input electrically coupled to a first coupling point and an output electrically coupled to a second coupling of the coupling module, the input being electrically isolated from the output;
  a transmitter circuit which drives the input in response to a digital logic signal, such that in response to a first type of digital data value in the digital logic signal, a signal of a first predetermined type is supplied to the input and in response to a second type of digital data value in the digital logic signal, a signal of a second predetermined type is supplied to the input, the signals of the first type and the second type each including an initiation signal that announces a predetermined time window during which another portion of the signals representing a digital data value of the first type or the second type will be valid; and a receiver circuit coupled to the output to receive signals in correspondence to the signals provided to the input, the receiver circuit adapted to decode a received digital logic signal from the received signals, such that the digital logic signals are transferred from the transmitter circuit to the receiver circuit at isolated and different potentials as serial data at a high transfer rate with a high degree of immunity to interference.

6. The isolator of claim 5, wherein the transmitter circuit is on a first substrate and the receiver is on a second substrate electrically isolated from the first substrate.

7. The isolator of claim 5, wherein the receiver circuit is adapted to decode a data signal that includes a signal indicating a binary value or an absence of a signal indicating an opposite binary value.

* * * * *